US012580309B2

(12) United States Patent
Li

(10) Patent No.: US 12,580,309 B2

(45) Date of Patent: Mar. 17, 2026

(54) CALIBRATION OF MULTI-ELEMENT ANTENNAS

(71) Applicant: Hughes Network Systems, LLC, Germantown, MD (US)

(72) Inventor: Mu Li, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 342 days.

(21) Appl. No.: 18/338,417

(22) Filed: Jun. 21, 2023

(65) Prior Publication Data

US 2024/0429600 A1 Dec. 26, 2024

(51) Int. Cl.
*H01Q 3/32* (2006.01)

(52) U.S. Cl.
CPC .................................... *H01Q 3/32* (2013.01)

(58) Field of Classification Search
None
See application file for complete search history.

(56) References Cited

U.S. PATENT DOCUMENTS

| | | | | |
|---|---|---|---|---|
| 11,486,922 | B1 | 11/2022 | Derat | |
| 2012/0051284 | A1* | 3/2012 | Chang | H04B 7/1851 370/316 |

FOREIGN PATENT DOCUMENTS

| | | | | |
|---|---|---|---|---|
| CN | 108540235 A | | 8/2018 | |
| EP | 4478064 A1 | * | 12/2024 | G01R 29/10 |
| WO | 2011093805 A1 | | 8/2011 | |
| WO | 2023278119 A1 | | 1/2023 | |

OTHER PUBLICATIONS

Alan et al., "Shuttle Experiment to Demonstrate High Accuracy Global Time and Frequency Transfer", IEEE Transactions on Geoscience and Remote Sensing, vol. GE-20, No. 3, Jul. 1982.

Lars Jacob Foged, "Draft Recommended Practice for Antenna Measurements", P149/D7, Oct. 2019, IEEE-SA Standards Board, Copyright 2010 The Institute of Electrical and Electronics Engineers, Inc., downloaded by EPO on Mar. 12, 2024.

International Search Report and Written Opinion dated Oct. 17, 2024 re International Appl. No. PCT/US2024/031809 filed May 31, 2024.

* cited by examiner

*Primary Examiner* — Whitney Moore

(74) *Attorney, Agent, or Firm* — Brooks Kushman P.C.

(57) ABSTRACT

A system for calibrating the multi-element antenna can include a computer including a processor and memory, wherein the memory stores instructions executable by the processor to detect a location of a laser signal incident on a receiving surface, the laser signal having been reflected from a reflector positioned over an area of a multi-element antenna. The instructions may additionally include instructions to compute a differential phase of an element of the multi-element antenna based on the detected location of the incident laser signal.

20 Claims, 4 Drawing Sheets

CALIBRATION OF MULTI-ELEMENT ANTENNAS

BACKGROUND

In a satellite communications network that utilizes satellites orbiting in a low Earth orbit, satellites of the network move in azimuth and/or in elevation with respect to a fixed ground station. To maintain communications with such satellites, a ground station may utilize an electronically scanned multi-element antenna. An electronically scanned multi-element antenna may operate by shifting the phase of excitation currents coupled to the elements of the multi-element array, so as to form a radiation or receiving pattern that concentrates power transmitted from or received by the antenna into a main beam aimed at the orbiting satellite. As the satellite moves with respect to the ground station, the phase distribution of excitation currents may be modified so that the main beam can constantly remain aimed at the satellite. Prior to installation at a ground station, an antenna may be calibrated so that the ground station can maintain control over the phase distribution excitation currents that bring about the narrow main beam.

DETAILED DESCRIPTION

Figure 1:
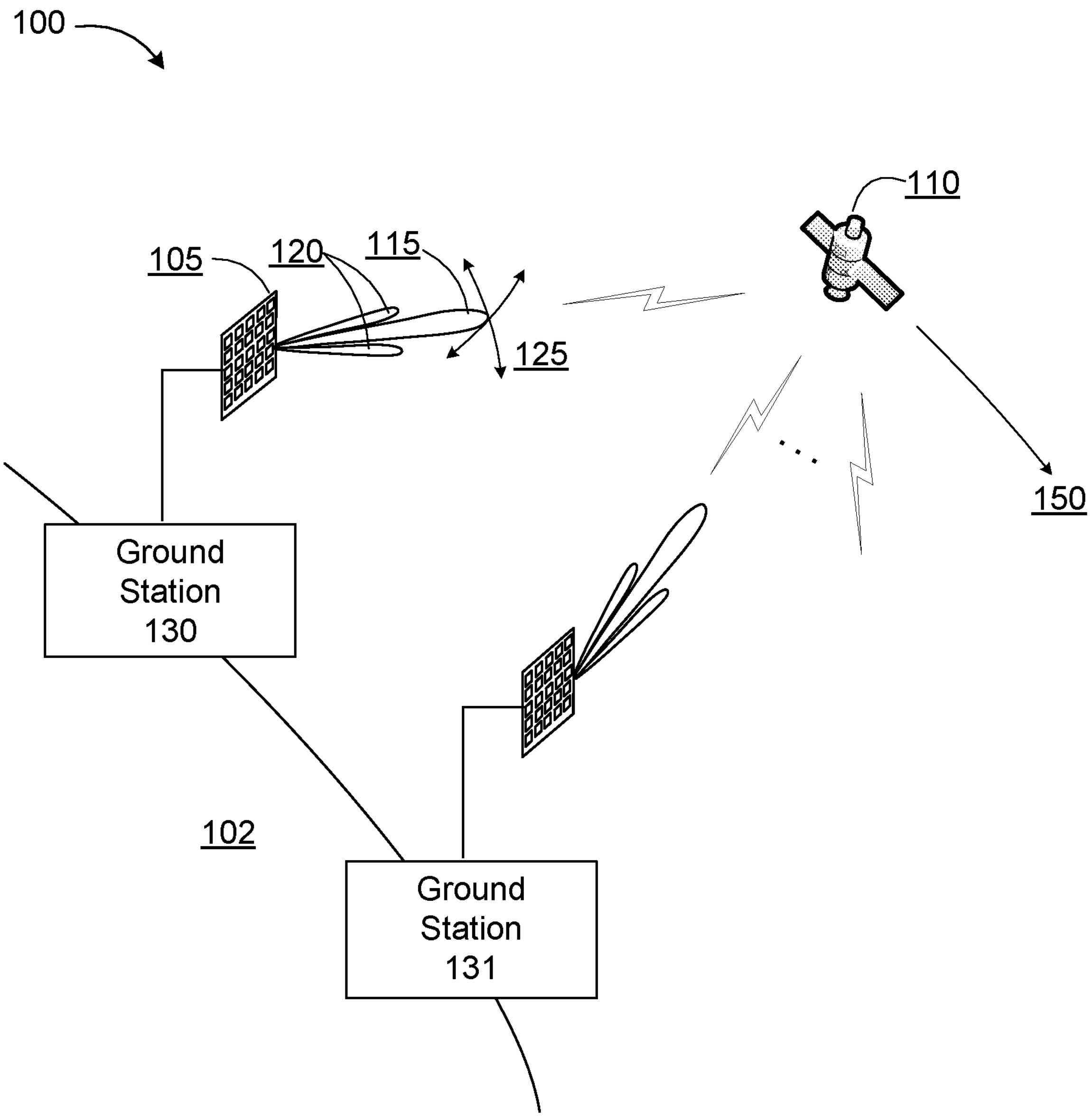
FIG. 1 is a diagram of an example communications network that utilizes satellites arranged in a low Earth orbit.

In the context of this disclosure, a multi-element antenna may include a phased array antenna. A phased array antenna, or any other type of multi-element antenna, means an antenna having individual radiating or receiving elements, arranged in one dimension, two dimensions, etc., in which the relative phase of the excitation currents coupled to the individual antenna elements form electromagnetic waves that combine to form a selected radiating or receiving pattern. In response to selectively adjusting the phase of individual excitation currents coupled to the elements of the multi-element antenna, a variety of radiation and receiving antenna patterns are possible. In a satellite communications system, a multi-element antenna may be useful in generating a narrow main beam so as to maintain suitable link margin between a transmitting ground station and a receiving satellite or between a transmitting satellite and a receiving ground station.

To generate a main beam having sufficient main beam directivity via a multi-element antenna, individual radiating or receiving elements of the antenna may be coupled to an individual amplifier and to a phase shifting component. For example, in transmitting a signal from a ground station to an orbiting satellite, an up-converted modulated signal may be divided into several signal streams. Each signal stream may then be phase-shifted and, in some instances, selectively adjusted in gain (e.g., amplified), for coupling to a radiating element of the multi-element antenna. In response to appropriate phase shifting, time-varying excitation currents representing the transmitted signal streams can form individual electromagnetic waves that combine in front of the antenna to form the selected radiation pattern. In another example, in receiving a signal from an orbiting satellite, electrical currents representing an up-converted signal received by the elements of the multi-element antenna may be phase-shifted and, in some instances, selectively amplified so as to focus a receiving main beam in the direction of the orbiting satellite.

However, in a manufacturing environment, variations in phase shifting components coupled to receiving or transmitting elements of a multi-element antenna may bring about a degradation in a radiating or a receiving pattern formed by the antenna. Such degradations can include reduced signal strength of the main beam of the antenna, degradation of an ability to control the direction of the main beam, widening of the main beam in one or more dimensions, reduced sidelobe suppression, etc. Thus, during a manufacturing process, a multi-element antenna may be calibrated at an outdoor antenna range. Such calibration may involve widely separating a pre-calibrated antenna, such as a pre-calibrated horn antenna, a pre-calibrated dipole antenna, etc., from the antenna under test. Use of an antenna range during the production process may increase the cost of the antenna, increase manufacturing times, etc. Further, uncontrolled weather conditions at the test range, multipath signal propagation, interference from external transmitters, etc., may introduce inaccuracies in the calibration process.

In some instances, use of an antenna range for testing multi-element antennas may be avoided via testing the antenna in an indoor facility. However, in an indoor facility, in which an antenna under test and a pre-calibrated antenna may be separated by a few meters or less, the antenna under test and the pre-calibrated antenna are positioned according to precise mechanical tolerances that may be difficult to achieve in a production environment. In the absence of appropriate precision, calibration errors may be introduced, thereby introducing inaccuracies in adjusting the phase relationships among the individual radiating or receiving elements of the multi-element antenna.

Advantageously, as described further herein, calibration of multi-element antennas, including phased array antennas, may be achieved in a production environment without precise mechanical alignment of a pre-calibrated antenna and an antenna under test. As described herein, mechanical misalignments between a pre-calibrated antenna test fixture and an antenna under test may be characterized and removed from parameters determined during the calibration process. For example, calibration of a multi-element antenna may involve placement of a reflector, such as a mirror, a prism, or other reflective surface, on or over a portion (e.g., a central area) of the multi-element antenna. A laser or other source of directed energy may be placed at a pre-calibrated antenna test fixture and aimed at the reflective surface. In response to the reflected laser signal being viewable on a receiving surface, which may be coplanar with the laser source, a distance between the laser source and the reflected laser signal may be computed. Such distance, which may be expressed in a Cartesian coordinate system, or other coordinate system, may be utilized to compute an error in the actual or true distances between the elements of the multi-element antenna and the pre-calibrated antenna test fixture. In response to characterizing the computed errors, the actual or true differential phases of the individual excitation currents coupled to the elements of the multi-element antenna can be computed.

Figure 2:
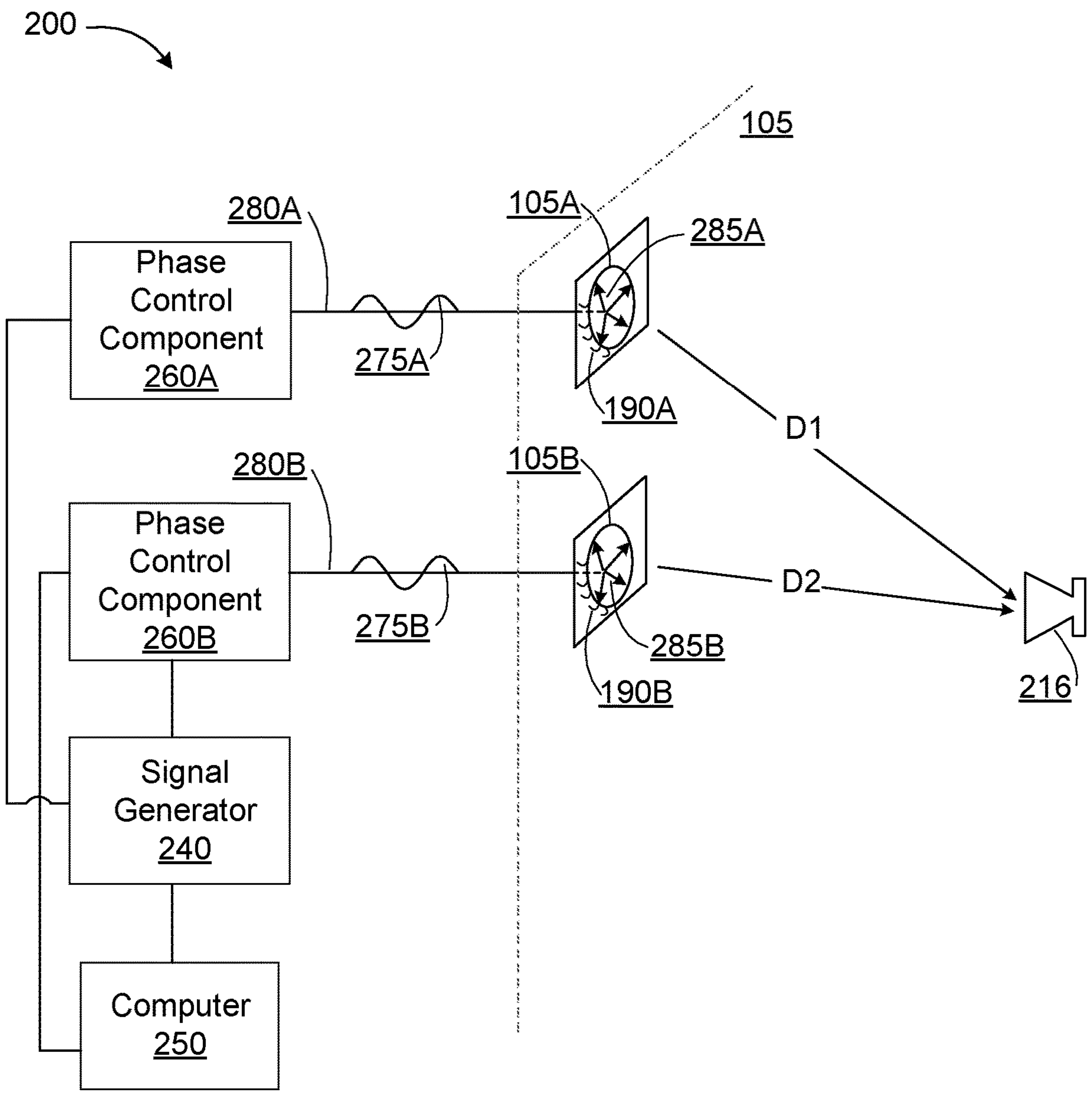
FIG. 2 is a diagram showing differential phases from first and second antenna elements of a multi-element antenna to pre-calibrated antenna.

In the context of this disclosure, a "differential phase" means a change in phase of a transmitted signal that results from a difference in over-the-air path length between a first element of a multi-element antenna and a second element of the antenna. Thus, in an example, such as shown in FIG. 2, for a multi-element antenna that includes a two-dimensional phased array antenna, the over-the-air path length from an element located at an outer edge of the antenna (e.g., a corner) to a pre-calibrated antenna may be greater than the over-the-air path length from an element located at the center of the antenna to the pre-calibrated antenna.

After computing the differential phases of the elements of the multi-element antenna to the pre-calibrated antenna, the phase of a transmitted signal present at the plane of the multi-element array can be determined. Accordingly, phase errors introduced by the phase shifting components of the multi-element antenna can be characterized and counteracted by directing the phase shifting component to increase or decrease the amount of phase shift introduced by the component.

An example system for calibrating a multi-element antenna can include a laser source positioned at a first distance from a multi-element antenna and aimed at a reflective surface over an area of the multi-element antenna. The example system can additionally include a receiving surface, positioned at a second distance from the multi-element antenna, to receive a signal from the laser source reflected by the reflective surface. The example system can additionally include a computer including a processor and memory, the memory storing instructions executable by the processor to compute a differential phase of an element of the multi-element antenna based on a location on the receiving surface at which the signal from the reflective surface is received.

In an example system, the reflective surface can be positioned over the center of the multi-element antenna.

In an example system, the elements of the multi-element antenna can include patch antennas.

In an example system, a first element of the multi-element antenna can be individually phase-controllable with respect to a second element of the multi-element antenna.

In an example system, the multi-element antenna can include a two-dimensional array of patch antennas.

In an example system, the elements of the multi-element antenna can be arranged in a two-dimensional array. The computer-executable instructions can further include instructions to compute pitch and roll angles of the two-dimensional array relative to the receiving surface. The instructions can additionally be to compute the differential phase error of the element of the multi-element antenna based on the computed pitch and roll angles.

In an example system, the receiving surface can include a planar surface.

In an example system, the receiving surface can be substantially coplanar with the laser source.

In an example system, the computer-executable instructions can further include instructions to modify a phase of a signal transmitted by an element of the multi-element antenna in response to computing the differential phase.

In an example system, the first distance and the second distance can be substantially equal to each other.

An example method can include transmitting a signal from a laser positioned at a first distance from a multi-element antenna to a reflective surface positioned over an area of multi-element antenna. An example method can additionally include receiving, at a receiving surface positioned at a second distance from the multi-element antenna, the signal from the laser reflected by the reflective surface. The example method can additionally include computing a differential phase of an element of the multi-element antenna based on a location on the receiving surface at which the signal from the reflective surface is received.

In an example method, the first distance and the second distance are substantially equal to each other.

An example method can additionally include computing pitch and roll angles of the two-dimensional array with respect to the receiving surface. The example method can additionally include computing the differential phase of the element of the multi-element antenna based on the computed pitch and roll angles.

In an example method, the reflective surface can be positioned over the center of the multi-element antenna.

In an example method, the elements of the multi-element antenna can include patch antennas.

In an example method, a first element of the multi-element antenna can be individually phase controlled with respect to a second element of the multi-element antenna.

In an example method, the multi-element antenna can include a two-dimensional array of patch antennas.

Another example system can include a computer having a processor and memory, the memory storing instructions executable by the processor to detect a location of a laser signal incident on a receiving surface, the laser signal having been reflected from a reflector positioned over an area of a multi-element antenna. The computer-executable instructions can additionally be to compute a differential phase of an element of the multi-element antenna based on the detected location of the incident laser signal.

In an example system, the elements of the multi-element antenna can be arranged in a two-dimensional array. The computer-executable instructions can additionally be to compute pitch and roll angles of the two-dimensional array relative to the receiving surface. The computer-executable instructions can additionally be to compute the differential phase of the element of the multi-element antenna based on the computed pitch and roll angles.

In an example system, the computer-executable instructions can further be to modify a phase of a signal transmitted by an element of the multi-element antenna in response to the computed differential phase.

FIG. 1 is a diagram of an example communications network 100 utilizing satellites arranged in a low Earth orbit. As seen in FIG. 1, satellite 110 orbits the Earth 102 within the communications range of multi-element antenna 105. Satellite 110 may be orbiting at a distance of between 300 kilometers and 1200 kilometers above the surface of the earth 102. In response to the relative motion of satellite 110 with respect to multi-element antenna 105, electronically scanned antenna main beam 115 may be constantly aimed in the direction of satellite 110 as the satellite proceeds along path 150. Multi-element antenna 105 may include a two-dimensional phased array antenna utilizing patch antennas as individual radiating elements. In another example, radiating elements of multi-element antenna 105 may include monopoles positioned above a ground plane of antenna 105, dipoles, or may utilize any other type of radiating or receiving element. In addition, multi-element antenna 105 may include any number of elements, such as between 5 and 25 elements arranged in a first direction, and between 5 and 25 elements arranged in a second direction perpendicular to the first direction. In the example of FIG. 1, multi-element antenna 105 is shown as a two-dimensional antenna array having a main beam capable of scanning in azimuth and in elevation, as indicated by arrows 125. Further, although indicated as generally rectangular in shape, in other examples multi-element antenna 105 may be of any other suitable shape, such as elliptical, circular, etc., depending on manufacturing costs, a satellite-to-ground or ground-to-satellite link budget, or other system-level parameters.

In addition to generating main beam 115, multi-element antenna 105 may generate sidelobes 120, which may include regions of reduced antenna gain with respect to main beam 115. Multi-element antenna 105 may generate a selected antenna radiation pattern in which sidelobes 120 radiate or receive a signal at a reduced amplitude with respect to main beam 115. Although FIG. 1 shows two sidelobes 120, in other examples, multi-element antenna 105 may generate further sidelobes in addition to the illustrated sidelobes 120. In accordance with a selected gain and phase distribution among elements of multi-element antenna 105, the antenna may generate an antenna pattern in which all sidelobes are of a fixed amplitude with respect to main beam 115.

In addition to communicating with ground station 130, satellite 110 may simultaneously or in a same time period communicate with other ground stations similar to ground station 130, which may utilize multi-element antennas similar to antenna 105. Satellite 110, and ground stations 130, 131, may utilize differing receive and transmit frequencies. For example, in a transmission mode (e.g., uplink), multi-element antenna 105 may operate at a frequency of between 26 gigahertz and 40 gigahertz. In a receive mode (e.g., downlink), multi-element antenna 105 may operate at a frequency of between 40 gigahertz and 75 gigahertz. In the transmit or the receive mode, multi-element antenna 105 may utilize main beam 115 to conduct communications with satellite 110.

In an example, main beam 115 may be relatively narrow in shape. For example, a half-power (e.g., −3 decibel) angle of main beam 115 may include an angle that is between about 1° and about 10°, so as to concentrate a substantial portion of radiated or received energy into main beam 115. In this context, a "half-power" angle means an angle, oriented in a forward direction with respect to the surface of a multi-element antenna, within which the antenna radiated or received power are equal to at least one-half of the power radiated or received at the peak of the main beam 115.

FIG. 2 is a diagram 200 showing differential phases from first and second antenna elements (105A, 105B) of multi-element antenna 105 to pre-calibrated antenna 216. As seen in FIG. 2, phase control component 260A, coupled to transmission line 280A, receives a signal stream from signal generator 240. Phase control component 260A modifies signal stream 275A for coupling to element 105A of multi-element antenna 105. In an example, signal stream 275A may include an up-converted modulated sinusoidal waveform at a transmission (e.g., uplink) frequency. Element 105A may include a patch antenna, such as a circular patch antenna, which receives signal stream 275A from transmission line 280A. Element 105A may include a metallic or other conductive material that produces excitation currents 285A in response to receiving signal stream 275A. Excitation currents 285A are conducted generally outwardly from a feed location toward an edge of element 105A. In response to encountering the outer edge of element 105A, electric field 190A can be generated between the edge of element 105A and a ground plane beneath element 105A. In accordance with the time-varying characteristic of signal stream 275A, electric field 190A forms electromagnetic signal emitted from element 105A.

Similarly, phase control component 260B, coupled to transmission line 280B, receives a signal stream from signal generator 240. Phase control component 260B modifies signal stream 275B for coupling to element 105B of multi-element antenna 105. In an example, signal stream 275B may include an up-converted modulated sinusoidal waveform at a transmission (e.g., uplink) frequency. Element 105B may include a patch antenna, such as a circular patch antenna, which receives signal stream 275B from transmission line 280B. Element 105B may include a metallic or other conductive material that generates excitation currents 285B in response to receiving signal stream 275B. Excitation currents 285B are conducted generally outwardly from a feed location toward an edge of element 105B. In response to encountering the outer edge of element 105B, electric field 190B can be generated between the edge of element 105B and a ground plane beneath element 105B. In accordance with the time-varying characteristic of signal stream 275B, electric field 190B may form an electromagnetic signal emitted from element 105B.

As previously described herein, to form a selected antenna pattern, such as an antenna pattern having main beam 115 (FIG. 1), elements (e.g., elements 105A, 105B) of multi-element antenna 105 may receive signal streams 275A and 275B from phase control components 260A and 260B that differ in phase in accordance with a selected phase distribution that permits antenna 105 to generate electronically scanned main beam 115. In determining a suitable relative phase generated by phase control components (e.g., 260A, 260B), an example calibration process operates to determine a phase differential resulting from a difference between path length D1 from element 105A to pre-calibrated antenna 216 and path length D2 from element 105B to pre-calibrated antenna 216. In response to determining the differential phase, an amount of phase shift to be introduced by phase control components 260A and 260B, normalized to the plane of multi-element antenna 105, can be determined.

It will be understood that although elements 105A and 105B are depicted as patch antennas having a generally circular shape, in other examples, elements 105A and 105B may be another suitable type of radiating or receiving antenna. Thus, elements 105A and 105B could include patch antennas that are shaped differently, such as elliptically shaped, square or rectangular shaped, etc. Further, elements 105A and 105B could include a monopole antenna above a ground plane, a dipole antenna, or another appropriate antenna.

Figure 3:
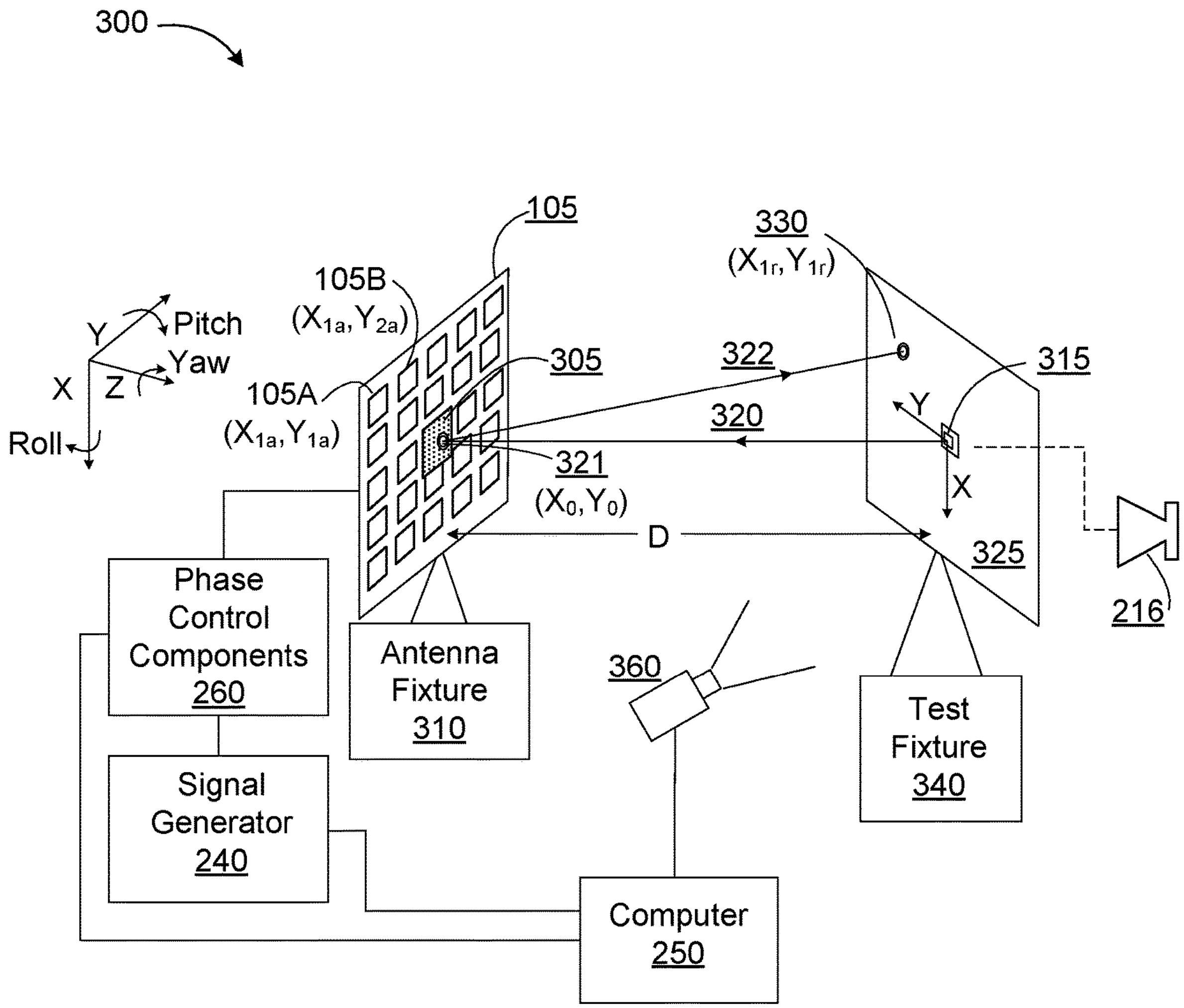
FIG. 3 is a diagram of components of a system for calibrating a multi-element antenna.

FIG. 3 is a diagram of components of a system 300 for calibrating a multi-element antenna. In the example of FIG. 3, multi-element antenna 105 is mounted to antenna fixture 310, which may include brackets, clamps, or other fasteners that operate to secure the antenna into place. Multi-element antenna 105 may be positioned at a distance of between 0.5 meters and 5.0 meters from laser source 315 positioned at a central portion of receiving surface 325. In an example, multi-element antenna 105, coupled to antenna fixture 310, may include a mechanical misalignment with respect to receiving surface 325. In the example of FIG. 3, a top portion of antenna 105 may be misaligned about pitch access Y with respect to receiving surface 325. Also in the example of FIG. 2, antenna 105 may be misaligned about roll axis X with respect to receiving surface 325.

In an example, after securing multi-element antenna 105 to antenna fixture 310, reflective surface 305 may be placed on or over a portion (e.g., a central portion) of the surface of the antenna. Reflective surface 305 may include a prism, mirror, or other reflector suitable for reflecting energy from laser source 315 located at a center portion of receiving surface 325. Laser source 315 may include any suitable commercially available laser, such as a ruby laser, a helium neon laser, or any other type of laser device capable of generating a coherent, collimated light beam. In the example of FIG. 3, laser source 315 may be aimed at reflective surface 305. Responsive to energizing laser source 315, transmitted laser signal 320 may be incident upon reflective surface 305 (e.g., at ($X_0$, $Y_0$), which may produce reflected laser signal 322 that is received at location 330 (e.g., $X_{1r}$, $Y_{1r}$) on receiving surface 325. Although $X_0$, $Y_0$ and $X_{1r}$, $Y_{1r}$ are expressed utilizing a Cartesian coordinate system, in which the Y-axis indicates a horizontal (e.g., a first) dimension and in which the X-axis indicates a vertical (e.g., second) dimension perpendicular to the Y-axis, use of such a coordinate system is arbitrary. Thus, in other examples, coordinates of received signal location 330 may be expressed using another coordinate system, such as cylindrical coordinates, spherical coordinates, etc.

It should additionally be noted that, although FIG. 3 shows laser source 315 located at the center portion of receiving surface 325, in other examples, laser source 315 may be located at a different portion of receiving surface 325, such as towards an edge or a corner of the receiving surface. In another example, laser source 315 can be positioned at a location outside of receiving surface 325. Thus, although FIG. 3 illustrates transmitted laser signal 320 and reflected laser signal 322 being transmitted or reflected over a substantially similar distance, e.g., distance D, in other examples, signal location 330 is not coplanar with laser source 315. In such an example, laser source 315 may be positioned at a first distance from multi-element antenna 105 and receiving surface 325 may be positioned at a different second distance from antenna 105.

Responsive to detection of a received signal at location 330, an operator, which can include a human operator or a machine vision application as represented by camera 360, the coordinates of location 330 can be utilized to determine the pitch and roll angles of the surface of multi-element antenna 105 with respect to receiving surface 325. In the example of FIG. 2, mechanical misalignment of antenna 105 with respect to receiving surface 325 are expressed as the pitch and roll of antenna 105 with respect to receiving surface 325. Equations (1) and (2), below, express a relationship between received signal location 330 ($X_{1r}$, $Y_{1r}$) and the pitch and roll angles of antenna 105.

$$\alpha = -\left(0.5\tan^{-1}\frac{Y_{1r}}{D} - \tan^{-1}\frac{Y_0}{D}\right) \tag{1}$$

$$\beta = 0.5\tan^{-1}\frac{X_{1r}}{D} - \tan^{-1}\frac{X_0}{D} \tag{2}$$

wherein $X_{1r}$, $Y_{1r}$ refer to received signal location 330 relative to the position of laser source 315, such as at or near the center of receiving surface 325, which may include a planar receiving surface. $X_0$, $Y_0$ refer to the location relative to the plane of multi-element antenna 105 at which laser signal 320 is incident upon reflective surface 305. In equations (1) and (2), α represents the roll angle of multi-element antenna 105 with respect to reflective surface 305, β represents the pitch angle with respect to the reflective surface, and D represents the distance between antenna 105 and the plane of receiving surface 325.

After computing roll angle α and pitch angle β, laser source 315 may be deenergized. In an example, laser source 315 may then be replaced by pre-calibrated antenna 216. In the example of FIG. 2, pre-calibrated antenna 216 is an antenna having a horn-shaped aperture with known gain characteristics. An example calibrated antenna can be obtained from the Pasternack Company, located at 17802 Fitch Ave, Irvine, CA (https://www.pasternack.com/26.5-ghz-to-40-ghz-wr28-standard-gain-horn-antennas-category.aspx). Equations (3), (4), and (5) may be used to compute the location of pre-calibrated antenna 216 with respect to multi-element antenna 105, as expressed below:

$$X_{horn} = -D\sin\beta \tag{3}$$

$$Y_{horn} = D\sin\alpha \tag{4}$$

$$Z_{horn} = D\cos\theta \tag{5}$$

wherein roll angle α and pitch angle β, are described above. The angle θ of equation (5) can be computed via equation (6), below:

$$\theta = \sin^{-1}\frac{\sqrt{X_{horn}^2 + Y_{horn}^2}}{D} \tag{6}$$

wherein, θ represents the angle between the boresight of multi-element antenna 105 and the direction of the center of pre-calibrated antenna 216 with respect to the center of antenna 105. X and Y of equation (6) represent the X and Y coordinates of the center of pre-calibrated antenna 216. By way of equations (1)-(6), the actual location of pre-calibrated antenna 216 with respect to the surface of multi-element antenna 105 can be determined.

In an example, equations (3), (4), (5), and (6) operate to characterize mechanical misalignments of the surface of multi-element antenna 105 with respect to pre-calibrated antenna 216. In the example of FIG. 3, in view of the coordinates ($X_{horn}$, $Y_{horn}$, and $Z_{horn}$) having been determined, the actual or true distance (d(m, n)) between pre-calibrated antenna 216 and the individual elements of multi-element antenna 105 can be determined, in accordance with equation (7), below:

$$d(m, n) = \sqrt{(X_m - X_{horn})^2 + (Y_n - Y_{horn})^2 + Z_{horn}^2} \tag{7}$$

In equation (7), $X_m$ and $Y_n$ represent the location of a particular element of multi-element antenna 105. The quantities m and n refer to an index of a selected antenna element. For example, for multi-element antenna 105 including a two-dimensional phased array antenna, in which each radiating or receiving element corresponds to a microstrip or stripline coupled patch antenna, a first element positioned at a top right corner of the array may be represented by a first coordinate $X_{1a}$, $Y_{1a}$ in the XY plane. An adjacent element may be located at a second coordinate in the XY plane, such as $X_{2a}$, $Y_{2a}$, for example. It should be noted that such indexing of elements of antenna 105 is an example and that another indexing scheme may be used. Equation (7) may be computed for each radiating or receiving element of multi-element antenna 105.

Equation (8), below may be used to compute the phase ($\Delta\phi(m, n)$) of a signal transmitted over-the-air from an element of antenna 105 to pre-calibrated antenna 216:

$$\Delta\phi(m, n) = -2\pi f \times \frac{d(m, n)}{c} \tag{8}$$

wherein f indicates the frequency of a radiated or received signal, c represents the speed of light, and d(m,n) represents the actual or true distance between an individual radiating or receiving antenna element m, n, computed via equation (7). Thus, similar to equation (7), equation (8) may be computed for each element of multi-element antenna 105. Based on multi-element antenna 105 being utilized for both transmitting signals (e.g., at a first frequency) and for receiving signals (e.g. at a second frequency), equations (7) and (8) may be used to compute the phase for each element of antenna 105 at a receiving frequency and used a second time again for each element of antenna 105 at a transmitting frequency.

It is noted that equations (7) and (8) operate to determine the differential phases of each radiating or receiving element of multi-element antenna 105. Further, in view of equations (1)-(7), the differential phases of each radiating excludes phase errors introduced by mechanical misalignments between multi-element antenna 105 and pre-calibrated antenna 216. In this context, a differential phase error means an error introduced by multi-element antenna 105 having a nonzero roll angle (α) and having a nonzero pitch angle (β) computed via equations (1) and (2). As described in reference to equation (7), roll and pitch angles of antenna 105 can be characterized (i.e., via equations (3), (4) and (5)) and subtracted from the X and Y distances (i.e. $X_m$ and $Y_n$ of equation (7)) to determine the true differential phases which would occur based on multi-element antenna 105 having negligible or zero roll and pitch angles. It is additionally noted that equation (8) represents a true differential phase for each element of multi-element antenna 105 in which differential phase errors are removed (i.e., via equation (7).

In equation (9), the over-the-air differential phase for each element of multi-element antenna 105 can be normalized to the plane of the antenna.

$$\phi'(m,n) = \phi(m,n) - \Delta\phi(m,n) \tag{9}$$

As described in reference to FIG. 2, for elements of antenna 105 near the edges of the antenna Δϕ(m, n) may represent larger values than for elements of antenna 105 near the center of the antenna. Via equation 9, the phase of signals received at pre-calibrated antenna 216 may be used to determine an actual phase of signals of a selected radiating element (105A, 105B) of antenna 105. Accordingly, individual phase shifting components 260 of antenna 105 can be calibrated so as to advance or delay a signal stream (e.g., 275A. 275B). Such calibration permits signals from signal generator 240B to be phase shifted and thus provide excitation signals that bring about a selected phase distribution among the elements of antenna 105. Thus, multi-element antenna 105 can be capable of electronically scanning main beam 115 so as to communicate with satellite 110.

Figure 4:
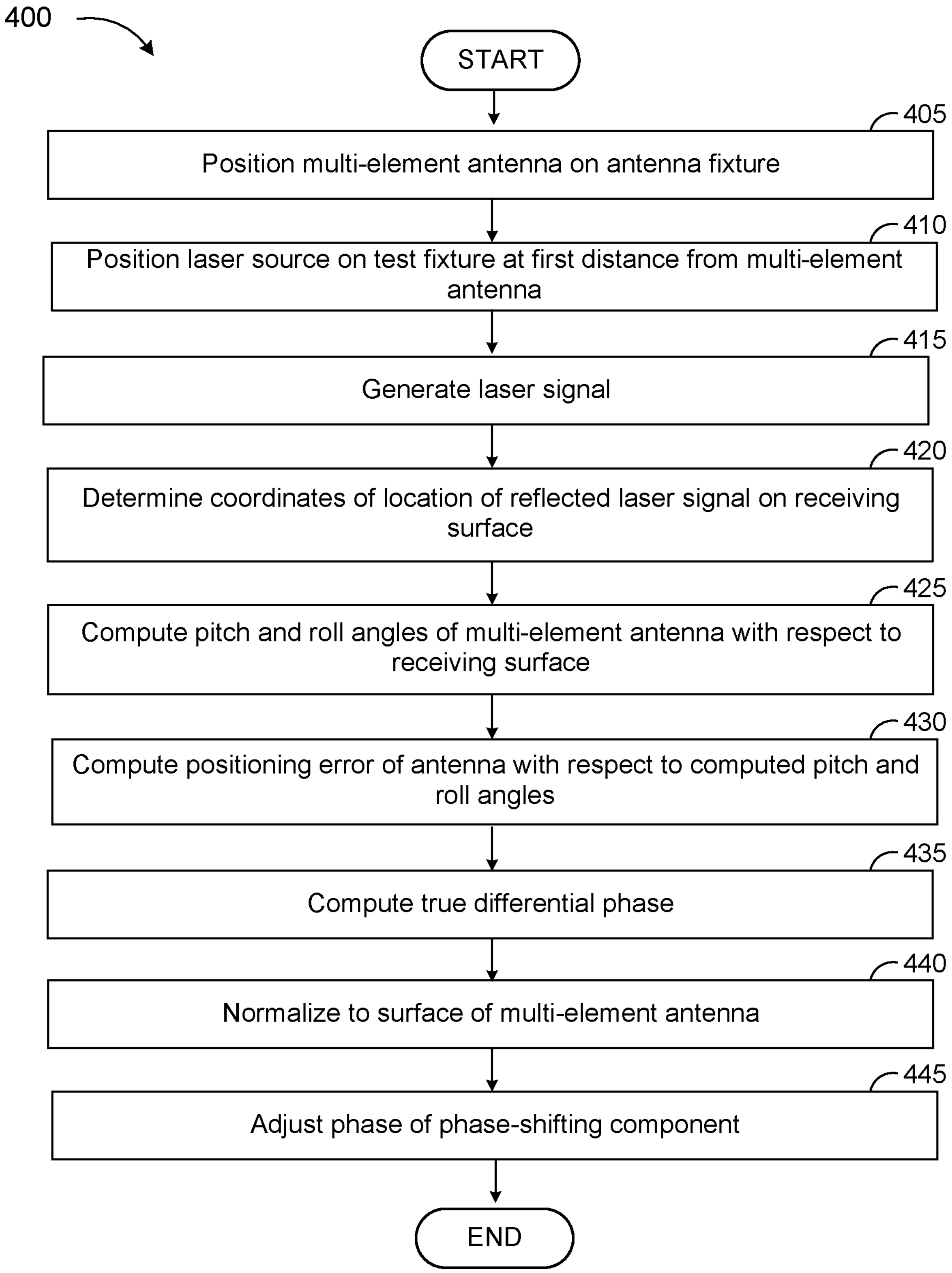
FIG. 4 is an example flow diagram of a method for calibrating a multi-element antenna.

FIG. 4 is a flow diagram of an example process 400 for calibrating multi-element antennas (e.g., 105). In process 400, multi-element antenna 105 is positioned on antenna fixture 310 in view of receiving surface 325. Reflective surface 305 can be placed on or over a portion of antenna 105, which may include the center of antenna 105 or another portion of antenna 105. Laser source 315, which may be positioned near the center of receiving surface 325 and aimed at reflective surface 305, can be energized so as to transmit laser signal 320 aimed at the reflective surface. Transmitted laser signal 320 may be incident upon receiving surface 305, e.g., at location 321, ($X_0$, $Y_0$). Based on the location 330 at which the laser signal is received at receiving surface 325, e.g., at $X_{1r}$, $Y_{1r}$, a distance, such as expressed in X and Y coordinates of a Cartesian coordinate system, can be utilized to compute the roll angle (α) and pitch (β) angles of antenna 105. The roll and pitch angles of antenna 105, along with the distance (D) between the surface of antenna 105 and receiving surface 325, can be used to determine an actual distance (d(m, n)) of pre-calibrated antenna 216 to the individual elements of antenna 105. The actual distances (d(m, n) can be used to determine the differential phase (Δϕ(m, n), in which the contributions of the change distance from the elements to pre-calibrated antenna 216 $((X_m-X_{horn})^2+(Y_n-Y_{horn})^2+Z_{horn}^2)$ are removed from determining the actual distance (d(m, n)). Based on the phase (Δϕ(m, n)) of a signal transmitted from antenna 105 received at pre-calibrated antenna 216, the phase of the signal can be normalized to the plane of the antenna ($\phi'(m,n)=\phi(m,n)-\Delta\phi(m,n)$). Accordingly, individual phase shifting components of antenna 105 can be calibrated so as to be advanced or delayed, thus permitting the phase shifting component to generate an excitation signal that accords with a selected phase distribution among the elements of antenna 105.

Process 400 begins at block 405, which includes positioning multi-element antenna 105 on antenna fixture 310. A position of antenna 105 on antenna fixture 310 may include one or more mechanical misalignments (e.g., in a roll and/or a pitch axis) with respect to antenna fixture 310, which may be located between 0.5 and 5 meters from the surface of antenna 105. Block 405 additionally includes placing reflective surface 305 on or over a portion of antenna 105.

Process 400 continues at block 410, which includes positioning laser source 315 on test fixture 340. Laser source 315 may include any suitable laser, such as a ruby laser, a helium neon laser, etc.

Process 400 continues at block 415, which includes activating laser source 315 so as to generate laser signal 320 that is incident on reflective surface 305 (e.g., at $X_0$, $Y_0$ relative to multi-element antenna 105). Block 415 additionally includes reflective surface 305 producing reflected laser signal 322, which can be incident on receiving surface 325, e.g., at $X_{1r}$, $Y_{1r}$ relative to the position of laser source 315 at the plane of receiving surface 325).

Process 400 continues at block 420, which includes determining coordinates of the location of the reflected signal on receiving surface 325. Block 420 can be performed by a human operator, such as by manually measuring coordinates (e.g., in a Cartesian, spherical, cylindrical, or another coordinate system) the location on receiving surface 325 at which the reflected laser signal 322, from reflective surface 305, is received. Alternatively or in addition, block 420 can be performed by a machine-vision measurement system, such as utilizing camera 360 and computer 250.

Process 400 continues at block 425, which includes computing a position error, such as rotation about a roll axis (angle α) and a pitch axis (angle β) of multi-element antenna 105 with respect to receiving surface 325. Computing of rotation of antenna 105 about roll and pitch axes can involve equations (1) and (2) described in reference to FIG. 2.

Process 400 continues at block 430, which includes computing a positioning error of multi-element antenna 105 via equations (3), (4), (5), and (6) using the surface of the antenna as the reference frame.

Process 400 continues at block 435, which includes computing actual or true differential phase is of elements (105A, 105B) of a signal transmitted, for example, from each antenna element to pre-calibrated antenna 216. Computation of actual or true differential phases of antenna elements (105A, 105B) may utilize the distance between an antenna element (e.g., 105A) that has been modified to remove a positioning error of multi-element antenna 105 via equations (3), (4), (5), and (6). The distance between an antenna element can be computed in accordance with equation (7).

Process 400 continues at block 440, which includes normalizing phases of signals transmitted, for example, from multi-element antenna 105 to the surface of the antenna. Normalizing of the phases of signals transmitted from elements (105A, 105B) to the surface of antenna 105 may involve computer 250 executing instructions to compute normalized phases of transmitted signals in accordance with equation (9).

Process 400 continues at block 445, which includes adjusting or shifting the phase of signals from phase control components (e.g., 260A, 260B) to provide a selected antenna pattern, such as antenna pattern having main beam 115 that can be electronically scanned in the direction of moving satellite 110.

Following block 445, process 400 ends.

Computers or processors utilized by, for example, computer 250 may include one or more processors coupled to a memory. A computer memory can include one or more forms of computer readable media, and stores instructions executable by a processor for performing various operations, including as disclosed herein. For example, the computer can be a generic computer with a processor and memory as described above and/or a controller, or the like for a specific function or set of functions, and/or a dedicated electronic circuit including an ASIC that is manufactured for a particular operation, e.g., an ASIC for processing radio data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

As used herein, a computer memory can be of any suitable type, e.g., EEPROM, EPROM, ROM, Flash, hard disk drives, solid state drives, servers, or any volatile or non-volatile media. The memory can store data. The memory can be a separate device from the computer, and the computer can retrieve information stored in the memory. Alternatively, or additionally, the memory can be part of the computer, i.e., as a memory of the computer or firmware of a programmable chip.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:

a laser source positioned at a first distance from a multi-element antenna and aimed at a reflective surface over an area of the multi-element antenna;

a receiving surface, positioned at a second distance from the multi-element antenna, to receive a signal from the laser source reflected by the reflective surface; and a computer including a processor and memory, the memory storing instructions executable by the processor to compute a differential phase of an element of the multi-element antenna based on a location on the receiving surface at which the signal from the reflective surface is received, the location being variable along the receiving surface.

2. The system of claim 1, wherein the reflective surface is positioned over the center of the multi-element antenna.

3. The system of claim 1, wherein elements of the multi-element antenna include patch antennas.

4. The system of claim 1, wherein a first element of the multi-element antenna is individually phase-controllable with respect to a second element of the multi-element antenna.

5. The system of claim 1, wherein the multi-element antenna includes a two-dimensional array of patch antennas.

6. The system of claim 1, wherein elements of the multi-element antenna are arranged in a two-dimensional array, and wherein the instructions further include instructions to:

compute pitch and roll angles of the two-dimensional array relative to the receiving surface; and compute the differential phase of the element of the multi-element antenna based on the computed pitch and roll angles.

7. The system of claim 1, wherein the receiving surface includes a planar surface.

8. The system of claim 1, wherein the receiving surface is substantially coplanar with the laser source.

9. The system of claim 1, wherein the instructions further include instructions to:

modify a phase of a signal transmitted by an element of the multi-element antenna by the differential phase.

10. The system of claim 1, wherein the first distance and the second distance are substantially equal.

11. A method, comprising:

transmitting a signal from a laser positioned at a first distance from a multi-element antenna to a reflective surface positioned over an area of multi-element antenna;

receiving, at a receiving surface positioned at a second distance from the multi-element antenna, the signal from the laser reflected by the reflective surface; and computing a differential phase of an element of the multi-element antenna based on a location on the receiving surface at which the signal from the reflective surface is received, the location being variable along the receiving surface.

12. The method of claim 11, wherein the first distance and the second distance are substantially equal.

13. The method of claim 11, further comprising:

computing pitch and roll angles of the two-dimensional array with respect to the receiving surface; and computing the differential phase of the element of the multi-element antenna based on the computed pitch and roll angles.

14. The method of claim 11, wherein the reflective surface is positioned over the center of the multi-element antenna.

15. The method of claim 11, wherein elements of the multi-element antenna include patch antennas.

16. The method of claim 11, wherein a first element of the multi-element antenna is individually phase controlled with respect to a second element of the multi-element antenna.

17. The method of claim 11, wherein the multi-element antenna comprises a two-dimensional array of patch antennas.

18. A system comprising:

a computer including a processor and memory, the memory storing instructions executable by the processor to:

detect a location of a laser signal incident on a receiving surface, the laser signal having been reflected from a reflector positioned over an area of a multi-element antenna; and compute a differential phase of an element of the multi-element antenna based on the detected location of the incident laser signal, the location being variable along the receiving surface.

19. The system of claim 18, wherein elements of the multi-element antenna are arranged in a two-dimensional array, and wherein the instructions are additionally to:

compute pitch and roll angles of the two-dimensional array relative to the receiving surface; and compute the differential phase of the element of the multi-element antenna based on the computed pitch and roll angles.

20. The system of claim 18 wherein the instructions are further to:

modify a phase of a signal transmitted by an element of the multi-element antenna by the differential phase.

* * * * *